United States Patent [19]
Andrew, Jr.

[11] Patent Number: 5,728,192
[45] Date of Patent: Mar. 17, 1998

[54] METHOD OF PROCESSING WASTE MATERIALS TO PRODUCE A PRODUCT USABLE AS A HEAT SOURCE AND PLANT GROWTH MEDIUM

[75] Inventor: William S. Andrew, Jr., Durham, N.C.

[73] Assignee: B & B Solid Waste Solutions, Inc., Durham, N.C.

[21] Appl. No.: 500,511

[22] Filed: Jul. 11, 1995

[51] Int. Cl.$^6$ .................... C05F 11/00; B01J 19/06
[52] U.S. Cl. ............... 71/26; 71/25; 71/63; 71/64.03; 71/64.04; 71/21; 71/23; 241/3; 241/28
[58] Field of Search ............................ 71/21, 23, 24, 71/25, 26, 63, 64.01, 64.03, 64.07, 64.11, 64.13, 903, 904; 241/328

[56] References Cited

U.S. PATENT DOCUMENTS

| | | | |
|---|---|---|---|
| 3,719,314 | 3/1973 | Cox | 225/97 |
| 4,050,917 | 9/1977 | Varro | 71/9 |
| 4,146,382 | 3/1979 | Willisch | 71/9 |
| 4,326,382 | 4/1982 | Burklin | 71/9 |
| 4,339,265 | 7/1982 | Engelmann | 71/9 |
| 4,369,054 | 1/1983 | Shinholster, Jr. et al. | 71/25 |
| 4,420,320 | 12/1983 | Hartmann et al. | 71/13 |
| 4,608,126 | 8/1986 | Watson et al. | 202/84 |
| 5,064,407 | 11/1991 | Reiffer | 241/3 |
| 5,192,354 | 3/1993 | Drysdale | 71/9 |
| 5,375,780 | 12/1994 | Gray et al. | 241/28 |

FOREIGN PATENT DOCUMENTS

| | | | |
|---|---|---|---|
| 2257697 | 1/1993 | United Kingdom | 71/24 |

OTHER PUBLICATIONS

National Georgraphic May 1991 article entitled "Once and Future Landfills", pp. 117–134.

Extract from book entitled Rubbish, the Archeology of Garbage by Rathie, 1992. pp. 110–123, 130, 238–250 No Month.

Article entitled "Composting Rural Landfill Wastes" by Riggle, and insert entitled Cotton Composting, North Carolina Chapter, ASLA, Jan. 5, 1992, pp. 12–13.

Excerpt from book entitled The American Cotton Handbook, vol. one, edited by Hamby, Interscience Publishers, pp. 58–78 (No date).

*Primary Examiner*—Ferris H. Lander
*Attorney, Agent, or Firm*—Olive & Olive, P.A.

[57] ABSTRACT

A method of processing fibrous waste materials, such as textile waste, in which the waste materials which are not particulate are formed into particles, and the particles are thoroughly mixed to form a waste mixture. The waste mixture has an increased temperature which allows the mixture to be used as a heat source as well as a plant growth medium. A particulate source of calcium may be added to the mixture if it is to be used as a plant growth medium. The plant growth medium may be mixed after formation with a dry wood waste mixture to enhance both its growth and heat properties.

22 Claims, No Drawings

METHOD OF PROCESSING WASTE MATERIALS TO PRODUCE A PRODUCT USABLE AS A HEAT SOURCE AND PLANT GROWTH MEDIUM

BACKGROUND OF THE INVENTION

1. Field of the Invention

This invention relates to methods of processing waste products, such as wastes from textile companies, and products resulting from such processing which are usable as a heat source and a plant growth medium.

2. Description of the Related Art

Many industrial processes, such as the processes for producing fabrics and other textile products, also produce large quantities of textile waste product. Industries which produce cellulose-containing vegetative or other fibrous wastes, such as synthetic fibers, are particularly problematic because of the low or non-existent biodegradation of the wastes. Examples include cotton waste produced from mills which utilize the cotton to make towels, bedding and clothing, and may produce 20–40 tons of cotton waste per week. Similarly, mills which produce cotton-polyester blend products, or other textile products also produce huge volumes of textile waste. The fibrous nature of many of these wastes means that the wastes may be fluffy, hard to manage, and not compact. Generally, the textile wastes are baled to aid in handling and to reduce the volume. Much of this waste is simply buried in landfills because there is no known economic way to utilize the waste. In some cases the waste is not biodegradable and large masses of such waste remain indefinitely in landfills.

Efforts have been made to utilize potentially edible textile wastes as animal feed products. Thus, cotton pellets having a size of about 6"×4"×4" have been formed for animal consumption. These products are generally high in bulk and low in nutritive value.

In addition to textile wastes, extensive amounts of landfill space are required for such wastes as stumps, branches, sawdust, bark fines, and other wood waste, and for construction wastes such as gypsum board and sheet rock. Sewage sludge and livestock wastes also are becoming an increasing disposal problem, requiring vast acreages for their disposal and presenting potential problems for contamination of drinking water.

As further background, it is well known that piling of sawdust as well as composting of natural materials produces internal heat. A compost pile as well as a sawdust pile can thus be looked at as sources of heat. However, so far as applicant is aware cotton waste has never been recognized as being a useful component of a heat source.

It is therefore an object of this invention to provide a method for utilizing textile wastes. It is a further object of this invention to provide a method for utilizing textile wastes which also utilizes other waste products.

It is a further object of this invention to provide a method for preparing a plant growth medium utilizing processed wastes. It is a further object of this invention to provide a plant growth medium.

It is a further object of this invention to provide a method for preparing and creating a heat source utilizing processed wastes, and to provide a method for heating a selected area with the heat source.

Other objects and advantages will be more fully apparent from the following disclosure and appended claims.

SUMMARY OF THE INVENTION

The invention herein provides a method for processing fibrous waste materials, such as textile waste, in which the waste materials which are not particulate are formed into particles, such as by use of a hammer mill and the particles are thoroughly mixed to form a waste mixture. It has been discovered that the process of forming the waste mixture results in heat formation within the mixture, which characteristic may be utilized as a heat source for general application or, for example, in the preparation of a heat pack. The waste mixture after being formed, may be used as a plant growth medium once the temperature is allowed to cool to plant growth temperatures. Once the temperature has dropped in a heat pack or other heat source utilizing the waste mixture, the cooled waste materials retain their original usefulness as a plant growth medium. To form particularly useful plant growth media, a particulate source of calcium may be added to the waste mixture during formation of the mixture. The plant growth medium of the invention may also be mixed after formation with a dry wood waste mixture containing dry wood waste to further increase its usefulness and benefit.

In concise summary, the invention provides a method for utilizing cellulosic and other waste materials to provide a mixture having the unusual and unique combination of characteristics of being useful as either a plant growth mechanism or a heat source.

Other aspects and features of the invention will be more fully apparent from the following disclosure and appended claims.

DETAILED DESCRIPTION OF THE INVENTION AND PREFERRED EMBODIMENTS THEREOF

In its broadest concept, the present invention includes a method of processing fibrous, cellulosic, vegetative and related waste materials, such as textile waste, together with wood waste, which method comprises:

(a) reducing any of the waste materials which are not in particulate form to particles; and at the same time, (b) mixing the particles thoroughly to form a waste mixture.

While other apparatus might be employed for the purpose, a hammer mill is useful for both forming and mixing particulate material.

As used herein, the term "particulate" means that large pieces are not present. For textile waste or other non-woody vegetative or other fibrous waste, this means that clumps of fibers have been reduced in size, and for wood waste this means that chunks of bark, branches, and the like have been reduced to a size where one cannot easily discern the part of the woody plant from which a particle comes. Practically, this means that the particles are in separate pieces, generally small enough to pass through a hammer mill screen, preferably a 1–2" screen. The majority of particles in the preferred mix are in the range of ⅛ to ¼-inch in diameter or less, due to the vigorous action of the hammer mill. The hammer mill action reduces the particle size before the 1–2" particles have a chance to fall through the screen. Larger masses may remain in the hammer mill for additional treatment until they are small enough to pass through the screen.

It has been discovered that "natural" heating results from the method of the invention because of a natural chemical reaction that occurs upon mixing cellulosic textile or other vegetative fibrous waste with wood waste and forming a pile of the mixed waste as described. It has also been discovered that running only textile waste or only wood waste through a hammer mill does not result in similar heating, and thus, that it is not just the process of grinding and mixing, in a hammer mill for example, that causes the heating. The natural heat, by itself, appears to hasten the process of conversion of the particulates to a relatively homogenous and useful mixture, which is generally quite black and has a fine, peat-like texture. Experimental results indicate that a temperature of about 145°–150° F. is reached very early during the mixing process and in all cases, within the first 24 hours. Depending on how the waste mixture is handled, for example, by being piled or alternatively by being spread out or confined in large containers, the waste mixture either cools gradually or maintains a temperature of about 150°–160° F. or more for a year or more, or loses heat at a rate between these extremes. This heat-producing property thus makes the waste mixture of the invention useful as a medium in which plants can be grown as well as being ideal for use as a sustained heat source.

In its broadest scope, the waste materials preferably include at least one cellulosic "textile waste" which is from a plant source, such as cotton fibers, or other vegetative material from plants. In addition, the waste materials preferably include wood waste derived from woody plants as discussed below.

"Textile waste" when used in the invention preferably includes cotton, which results in higher heat production more rapidly, and which has a positive effect on product nutrient value. Cotton contains a very high percentage of cellulose I or "native cellulose". Cellulose I is also found in such plants as flax, ramie, jute and hemp. Cotton wastes from cotton gin operations and whole plant cotton wastes are, for the purposes of this invention, also included within the term "textile waste". Cotton-containing wastes and have been found to be particularly useful in the invention in producing a waste mixture that can serve as either a steady temperature heat source or as a beneficial growth medium. Most preferably, textile waste used in the invention is at least 50% cotton or other natural fibrous waste having similar characteristics to optimize heat production and transformation of the components to a usable growth medium.

Alternatively, cotton-polyester, or a mixture of cotton and cotton-polyester may be used. One advantage of using the invention for polyester-containing wastes is that such wastes generally cannot be used for animal feed due to the presence of synthetics. Rayon or other waste derived from cotton may also be used in the preferred embodiment.

Because fibrous textile wastes, particularly cotton fiber wastes, are generally bulky and not compact, it is best to use such waste in the form of pellets. Alternatively, textile waste in small wads or clumps may be used, so long as they are hammer-milled together with the wood wastes. Otherwise, the textile fibers tend to re-adhere together, and do not remain particulate. Although use of bulk textile waste, such as baled cotton, generally results in excessive lint release which tends to jam the hammer mill, this problem may be resolved by utilizing machines known in the art (e.g., napping machines) which can remove smaller portions of the cotton bale for addition of smaller volumes of cotton waste to the hammer mill at any one time.

It has also been found that vegetative leafy wastes such as the wastes from tobacco leaf processing plants may be utilized in the invention, especially when also utilizing cotton or related textile wastes. The tobacco leafy wastes are typically 35–40% organic residue from the plants and 60–65% sand and soil.

All or part of entire cotton plants containing roots, stalks, leaves and/or cotton bolls may also be used in the invention. In this case, because the waste is not just cotton fibers, the wastes may be baled before being fed through a hammer mill without resulting in the excessive lint buildup discussed herein which occurs with cotton fiber bales.

Preferably, the wood waste which is mixed with the fibrous cellulosic waste is made up of previously untreated sawdust, bark fines, pressed board waste, and/or waste portions of woody plants. If sawdust is used, it has been discovered that best results are obtained if the sawdust is newly formed sawdust. Older sawdust, which has generally begun to decompose, does not heat as fast. Although any type of wood wastes may be used, hardwood waste is preferred, particularly as a source of bark waste.

For many plant-growing purposes it is useful to add a particulate source of calcium to the waste mixture, for example, a calcium-containing construction waste, such as gypsum board and sheet rock. The amount added may be as advisable for a particular plant calcium requirement, for example, about 10% by volume of the mixture, preferably added during the hammer mill (mixing and grinding) process to facilitate even distribution.

The proportions of components appear not to be critical except that preferably the amount of cotton or other fibrous cellulosic waste or combination thereof is at least about 15% by volume, and preferably the amount of wood waste (sawdust, bark fines, wood fibers) is at least about 40–45% by volume. Lower amounts of cellulosic waste (e.g., 5–10% by volume) may be used if there are many components, for example, when sludge is used (discussed below), if heat production or heat maintenance is less important, and if nutrient content is unimportant. Very fine wood waste, such as sawdust and bark fines, the size of sawdust particles, when used preferably comprise at least about ⅓ of the wood waste. Most preferably the amount of cotton or related waste is about 15–40% by volume and the amount of wood waste is about 45–75% by volume of the waste mixture, with exact percentages used in the invention depending on the type of waste available and the intended use of the product. Thus, a calcium source is not essential if the waste mixture product of the invention is to be used in a heat pack as discussed herein or used as a growth medium in soils high in calcium. For use in the heat pack of the invention, preferably 33–40% cotton is used.

It has been found that a hammer mill is best for grinding and reducing any non-particulate waste to particles, and for mixing the particles together. A preferred hammer mill is a tub-grinder, for example, the Toro 10-foot tub-grinder; however any apparatus capable of reducing the wastes to particles as discussed above, while mixing the wastes thoroughly, and screening out large masses is acceptable. A hammer mill powered by as low as a 2 horsepower motor may be used for small batches, but preferably a hammer mill equipped with at least a 200–300 horsepower motor is used. Mixing of the waste is deemed important. The wastes, for example, wood waste and textile waste, may be mixed together prior to forming either waste into particles, or the waste may be mixed during the formation of particles. The hammer mill processing of the components of the invention has been found to result in substantially immediate heat formation.

Once the particles are processed through the hammer mill and the hammer mill screen, they are placed in containers appropriate for the desired end-purpose of the product as discussed herein. The process of preparation of the product of the invention requires no added water or moisture to yield the desired product. If the process occurs outside, however, and rainwater gets into the hammer mill or resulting products, it has been found that no appreciable harm is done to the final product. Addition of substantial quantities of water is not required or preferred, particularly if the product is to be used for a heat source, as there might be some cooling of the product.

A usable plant growth medium according to the invention is formed from the above method of the invention during mixing or within the first day after mixing and is thereafter almost immediately usable for growth of plants. The texture and appearance show some improvement in the first few days after mixing, but the waste mixture product of the invention is useful as a growth medium at any time.

The plant growth medium of the invention may be mixed after formation with a dry wood waste mixture containing dry wood waste, finely divided wood particles, and other particulates, such as sand, to form a superior blended plant growth product, which is a very complete plant growth medium. The dry wood waste which can be added to the mixture of the present invention is preferably formed using the method of Andrews et al. (U.S. Pat. No. 5,435,819 issuing on Jul. 25, 1995, from Ser. No. 08/223,839).

In the Andrews et al. method, stumps, branches and other tree and bush sections, upon which soil or sand may be adhered, are piled in large piles. Water can drain through the piles, and plants are allowed to grow thereon, resulting in a finely divided wood waste product having the chemical characteristics and appearance of soil. The fine product formed from the piles is mixed with finely divided wood particles which may be sawdust, bark fines, or other wood particles, and with other particulates, such as sand. The other particulates may also comprise vermiculite, polyester or plastic particles, so long as they are not contaminated with any chemical that would retard or diminish plant growth. The components of the dry wood waste mixture produced by the Andrews et al. method are preferably present at about 45%, by volume, dry wood waste product, about 45% finely divided wood particles, and about 10% sand or other particulate or mixture thereof.

A blended plant growth product containing a dry wood waste mixture produced by the Andrews et al. method described above and containing the plant growth medium of the present invention preferably contains between ⅓ to ½, by volume of the plant growth medium (containing the fibrous waste mixture of the invention) and between about ½ to ⅔ of the dry wood waste mixture.

As mentioned above, it has been discovered that the mixed plant growth product of the invention if handled and kept in bulk, preferably without further mixing, retains a high temperature for an extended period of time. This feature allows the waste mixture product of the invention to be used as a source of heat, analogous to heated bricks, except that it has been discovered that the product of the invention if maintained in a bulk form will retain its heat for periods up to and beyond a year after original formation of the product by the method disclosed herein. For example, use of the product of the invention in a heat pack is discussed in Example X herein.

It has been discovered that in addition to the formulations discussed above, a useful plant growth medium and heat source can be made if the product also contains sludge, preferably 10–40% by volume. Within this range, lower levels are used if the sludge is high in metals or if for other reasons needs to be in a more dilute form. The term "sludge" as used herein includes sewage sludge (human waste), chicken manure, hog, cow or horse manure, and the waste of other animals. The sludge used in the invention can be from one or more of these animal sources. The sludge is preferably in cake or other relatively dry form, but if excess moisture is present, it is absorbed by the other wastes and does not present a problem.

When sludge is used in the invention, it remains important to have both cellulosic fibrous waste and wood waste added. In addition, a calcium source as discussed herein may be used, as may other vegetative material such as tobacco leaf waste. The product containing the sludge provides a good soil cover for land fills, strip mines, or other mined, barren or waste lands. The use of sludge in the invention allows reduction or elimination of waste lagoons for commercial hog and chicken farms, thus reducing the likelihood of groundwater contamination. Furthermore, the blending of the sludge with the other components of the invention provides a method of lowering the concentration of heavy metals and other pollutants to levels where they meet safety requirements and associated governmental regulations, without adding other potentially harmful chemicals to the wastes.

The features and advantages of the present invention will be more clearly understood by reference to the following examples, which are not to be construed as limiting the invention.

EXAMPLES

Example I

Processing of Textile Waste

The following approximate percentages (by volume) are preferred for use in the invention to form a useful plant growth medium when standard textile wastes are used:

Textile wastes (either cotton or polyester-cotton )(50–50)—25%
Hardwood sawdust (new preferred, or aged)—25%
Hardwood bark fines—20%
Hardwood wood fibers—20%
Sheet rock and associated paper cover—10%

This formulation when ground and mixed in a hammer mill and accumulated in bulk, e.g. in a ten cubic yard pile, results in a product having an internal temperature of 150°160° F. in 24 hours without the addition of any chemicals or water. This product may be used for a plant growth medium and has a predicted shelf life of five or more years with, at most, very small amounts of additional fertilizer being needed.

Example II

Processing of Cotton Gin Waste

The following approximate percentages (by volume) are an example of a formulation which may be used in the invention to form a useful plant growth medium when cotton gin wastes are used:

Cotton gin waste—25%
Pine sawdust (new)—25%
Hardwood bark fines—20%
Hardwood wood fibers—20%
Sheet rock and associated paper cover—10%

This formulation when ground and mixed in a hammer mill and accumulated in bulk as in Example I results in a product having an internal temperature of 150°–160° F. in 24 hours.

Example III

Processing of Polyester-Cotton Waste

The following approximate percentages (by volume) are an example of a formulation which may be used in the invention to form a useful plant growth medium when polyester wastes, together with tobacco sweeping screenings, are used:

Polyester textile waste—12.5%
Cotton from yarn mill—12.5%
New hardwood or softwood (not pine) sawdust—25%
Hardwood bark fines—10%
Hardwood wood fibers—10%
Sheet rock and associated paper cover—5%
Tobacco leaf processing wastes:
    organic residue—10%
    sand and soil—15%

This formulation when ground and mixed in a hammer mill and accumulated in bulk as in Example I results in a product having an internal temperature of 150°–160° F. in 24 hours.

Example IV

Processing of Cotton Plant Waste

The following approximate percentages (by volume) are an example of a formulation which may be used in the invention to form a useful plant growth medium when vegetable wastes formed from cotton plants grown to maturity are used:

Entire cotton plant (baled roots, stalks, leaves, cotton)—40%
New sawdust—30%
Hardwood bark fines—30%

This formulation when ground and mixed in a hammer mill and accumulated in bulk as in Example I results in a product having an internal temperature of 150°–160° F. in 24 hours.

Example V

Processing of Cotton/Polyester Waste to Form Product for Heat Pack

The following approximate percentages (by volume) are an example of a formulation which may be used in the invention to form a useful heat pack, or for a plant growth medium, when cotton/polyester wastes are used:

Polyester waste—17%
Cotton fiber waste—17%
Sawdust, hardwood bark fines, hardwood wood fibers-any combination of one or more of these to make 66% of the total This formulation when ground and mixed in a hammer mill and accumulated in bulk as in Example I results in a product having an internal temperature of 150°–160° F. in 24 hours.

Example VI

Processing of Cotton Waste to Form Product for Heat Pack

The following approximate percentages (by volume) are a preferred formulation which may be used in the invention to form a useful heat pack, or plant growth medium, when various cotton wastes are used:

Cotton fiber waste (from cotton gin, yarn mill or elsewhere) —33%
New sawdust, new hardwood bark fines (size of sawdust), hardwood wood fibers—any combination of one or more of these to make about 67% of the total This formulation when ground and mixed in a hammer mill and accumulated in bulk as in Example I, and preferably screened through a 1–1.5" screen, results in a product having an internal temperature of 150°–160° F. in 24 hours.

Example VII

Use of Sludge in Product of the Invention

The following approximate preferred percentages (by volume) may be used in the invention to form a useful heat pack, or plant growth medium, when sludge is one of the components of the invention:

Sludge (from any human or animal waste source(s)—10–40%
Cotton fibers or cotton waste; cotton polyester waste—10–40% of any combination of such wastes
Sawdust from hard or soft woods—10–40% (other wood wastes may also be included)

Optionally, waste from tobacco leaf plants as discussed herein may be added. The product may also include 5–10% dacron or rayon waste.

This formulation when ground and mixed in a hammer mill and accumulated in bulk as in Example I results in a product having an internal temperature of 150°–160° F. in 24 hours.

Example VIII

Use of Textile Waste Mixture

The product formed in any of the Examples I-VII may be used for growing plants, generally without further mixing or additions.

Additional plant growth formulations which have been found suitable for particular plant requirements include use of one of the plant growth media defined by Examples I-VII with one of various wood waste formulations, as for example, utilizing a dry wood waste product made by the previously described Andrews et al. method.

A dry wood waste product such as produced by the Andrews et al. method is preferably mixed in equal volumes with sawdust or other finely divided, untreated wood particles, plus about 10% sand by volume, to form a dry wood waste mixture. Two preferred plant growth products including this last mentioned dry wood waste mixture and the plant growth medium of Example I are:

| Product No. | Dry Wood Waste Mixture (proportion by volume) | Plant growth medium (proportion by volume) |
|---|---|---|
| 1 | 2/3 | 1/3 |
| 2 | 1/2 | 1/2 |

Example IX

Use of Product of the Invention for Growing Tomatoes

Any of the above formulations may be used as a plant growth medium. The selected plant growth medium is placed in garden beds, and plants are planted and grown using standard gardening methods. The result, when compared with tomato plants grown in garden soil under the same environmental conditions, is the production of huge plants bearing tomatoes which are much larger than standard tomatoes. Typical tomato plant size is 10–12 feet tall. Similar results are seen for other cultivated plants.

Example X

Use of Product of the Invention in Heat Pack

Any of the products formed according to the invention may be used in a heat pack, however, those particularly high in cotton waste have been found to be particularly useful for this purpose due to the high, relatively long life and constant heat produced. When this product is packaged in large containers, for example, 4'×5'×6' or more, immediately after mixing, the heat pack maintains a temperature of at least 120° F. for at least a year or more.

Preferably at least about 6–10 cubic yards of the product of the invention is used in a heat pack; however, heat is maintained in a heat pack having dimensions as small as 3'×'×3', which is one cubic yard, if sufficient cotton and sufficient wood waste are used. The minimum concentrations allowing such heat production have been found to be: 15% or more by volume of cotton or related cellulosic fibrous waste as discussed herein and 40% or more by volume of wood waste.

The above described "heat pack" or "energy pack" can be used in the same manner as any other heat source, for example, by using standard methods to cycle water through or within the heat pack to provide hot water or to heat water in a hot-water heating system. The heat pack may be made interchangeable so that when the internal temperature begins to decline, the pack may be replaced with a new pack, connected directly to the system requiring heating. The cooled waste mixture within the heat pack nevertheless remains useful as a plant growth medium and may be used and/or combined with other wastes in the same manner as for a waste mixture that has not been used in a heat pack.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. A method for processing fibrous waste materials, comprising:
   (a) providing waste materials comprising untreated wood waste selected from a group consisting of woody plant-tree waste, sawdust, bark fines, pressed board waste and cellulosic fibrous waste selected from a group consisting of wastes containing cotton, polyester, wastes containing cotton-polyester, and wastes containing a mixture of cotton and cotton-polyester; and
   (b) grinding and mixing the said untreated wood waste and cellulosic fibrous waste materials simultaneously with mixing particles thereof thoroughly to form a waste mixture having the said untreated wood waste and said cellulosic fibrous waste in said waste mixture in a particulate ground and mixed form and in the form of a pile having about 40–75% by volume untreated wood waste particles and about 15–40% by volume cellulosic fibrous waste particles and further characterized by exhibiting after forming of the pile substantially immediate heat formation and a corresponding substantially immediate rise in internal temperature of the pile.

2. A method for processing fibrous waste materials as claimed in claim 1 wherein said waste mixture comprises a plant growth medium and including the step prior to forming said pile of mixing said waste mixture with a dry wood waste mixture containing a dry wood waste product in a ratio of dry wood waste mixture to waste mixture of from about 0.50:0.50 to about 0.67:0.30 by volume.

3. The method of claim 2, further comprising mixing a selected volume of sludge with the particles in step (a) and wherein said selected volume of sludge is 10–40% of the total volume of the waste mixture.

4. A plant growth medium product made by the method of claim 2.

5. The product of claim 4, wherein the dry wood waste mixture comprises between about ½ and ⅔ by volume of the volume of the plant growth medium.

6. A method for processing fibrous waste materials as claimed in claim 1 including the step of maintaining said waste mixture heat formation over a period of at least several days and in the absence of moisture being added to said waste mixture.

7. A method for processing fibrous waste materials as claimed in claim 1 wherein said pile of waste mixture comprises a heat source and including the steps of:
   (a) placing said waste mixture in a container such that heat generated within said container is retained for extended periods of time; and
   (b) utilizing the container of the waste mixture as a heat source.

8. The method according to claim 7, wherein utilizing the container comprises passing water to be heated through the waste mixture.

9. The method of claim 1, including operating said pile such that its internal temperature reaches 150°–160° F. within about twenty-four hours following formation of said pile of waste mixture.

10. The method of claim 1, further comprising the step of adding a particulate source of calcium and which said particulate source of calcium comprises at least 5% by volume of the volume of said waste mixture.

11. The method of claim 10, wherein the particulate source of calcium is a calcium-containing construction waste.

12. The method of claim 11, wherein the construction waste is selected from the group consisting of gypsum board and sheet rock.

13. A plant growth medium product made by the method of claim 10.

14. The method of claim 1, wherein the cellulosic fibrous waste is formed into a pellet prior to reducing the cellulosic fibrous waste to particles.

15. The method of claim 1, including the step of utilizing a hammer mill to reduce any non-particulate waste forming part of said waste materials to particles and to mix the particles together.

16. The method of claim 1, wherein said wood waste includes newly formed sawdust.

17. The method of claim 1, further comprising mixing a selected volume of sludge with said waste mixture prior to forming said pile and wherein said selected volume of sludge is 10–40% of the total volume of the waste mixture.

18. The method of claim 1, further comprising mixing a selected volume of sludge with the particles in step (b) and wherein said selected volume of sludge is 10–40% of the total volume of the waste mixture.

19. The method of claim 2, wherein said dry wood waste mixture contains about 45% by volume of dry wood waste product, about 45% by volume of finely divided wood particles, and about 10% by volume of other particles.

20. The method of claim 19, wherein said other particles comprise sand.

21. A plant growth medium product made by the method of claim 1.

22. A plant growth medium made by the method of claim 1 and further comprising a selected volume of sludge and wherein said selected volume of sludge is 10–40% of the total volume of the waste mixture.

* * * * *

UNITED STATES PATENT AND TRADEMARK OFFICE
CERTIFICATE OF CORRECTION

PATENT NO.   : 5,728,192
DATED        : March 17, 1998
INVENTOR(S)  : William S. Andrews, Jr.

It is certified that error appears in the above-identified patent and that said Letters Patent is hereby corrected as shown below:

Item [19]
Title Page, Inventor: "Andrew" should read --Andrews--.

Column 3, line 32, after "wastes", "and" should be eliminated.

Column 9, line 21, change "3'X'X3'" to read --3'X3'X3'--.

Column 10, line 38, in Claim 10, "which" should read --wherein--.

Signed and Sealed this

Sixteenth Day of June, 1998

Attest:

BRUCE LEHMAN

Attesting Officer                Commissioner of Patents and Trademarks